United States Patent [19]

Rapkin et al.

[11] 3,777,144

[45] Dec. 4, 1973

[54] GAMMA SPECTROMETRY SYSTEM FOR SAMPLE ANALYSIS

[75] Inventors: Edward Rapkin, Short Hills; Edward W. Thomas, Morris Plains, both of N.J.

[73] Assignee: Intertechnique S.A., Plaisir, France

[22] Filed: Jan. 19, 1972

[21] Appl. No.: 218,969

[52] U.S. Cl. .................................... 250/366
[51] Int. Cl. ........................... G01t 1/20, G01t 7/00
[58] Field of Search .................. 250/71.5 R, 106 SC

[56] References Cited
UNITED STATES PATENTS

| | | | |
|---|---|---|---|
| 3,114,835 | 12/1963 | Packard | 250/106 SC X |
| 3,515,878 | 6/1970 | Ried, Jr. et al. | 250/106 SC X |
| 3,626,187 | 12/1971 | Laney | 250/71.5 R |

Primary Examiner—Archie R. Borchelt
Attorney—Cameron, Kerkam and Sutton

[57] ABSTRACT

A system for measuring the activities of gamma emitters of different energies in successive samples includes a transducer, a plurality of linear amplifiers in cascade, and several single channel analyzers. Each single channel analyzer may be connected to the output of any one of the amplifiers by a switch which may also be used to select one of the several preset windows of the corresponding analyzer.

15 Claims, 5 Drawing Figures

GAMMA SPECTROMETRY SYSTEM FOR SAMPLE ANALYSIS

The present invention relates to a system for measuring gamma radioactivity from samples and, more particularly, to a system for separately counting the activities of different emitters in multi-labeled or mixed samples.

Prior art systems exist which comprise one or more photomultipliers each receiving the light flashes (scintillations) from a scintillator crystal when acted upon by a gamma ray, an amplifier, and one or more single channel analyzers, each of which feeds a scaler. But such a system is poorly adapted to spectrometry of successive samples including two radioisotopes emitting gamma rays having widely different energies, such as iodine-125 and cobalt-60, since the pulse height analyzer window (or windows) should be narrow to minimize counting backgrounds. Such narrow window settings are subject to error originating from a number of causes such as parallax and backlash in the dials of the adjusting potentiometers, and temperature drift and jitter in the circuitry. Further, a small change in amplification gain due to temperature or to variation in count rate, may cause a part of the peak to move outside the window.

A method for overcoming the problem was developed and consists of providing each single channel pulse height analyzer section with its own amplification means; each channel has a linear amplifier of fixed gain preceded by a variable attenuator for gain adjustment. Operation of the system is rather complex and time consuming. Accurate attenuation requires the presence of several controls in series making for operational complexity and, with each channel having its own amplifier, a setting made in one channel is not likely to give precisely the same results as a similar setting in another. When a number of channels are embodied in the system, this solution proves rather costly since each channel requires an amplifier and an attenuator as well as the several attenuator controls.

It is an object of the present invention to solve the above mentioned problems while using only linear amplifiers and relatively simple circuitry. It is another object of the invention to provide a system in which a single manual control permits simultaneous selection of the proper gain and an appropriate window for single labeled or multi-labeled samples. It is still another object of the invention to provide a system in which a predetrmined number of optimum window settings may be permanently retained and may be reproduced by switch selection.

Other objects and advantages of the invention will appear from the following description of preferred embodiments of the invention, given only as examples, and which refers to the accompanying drawings.

Figure 1:
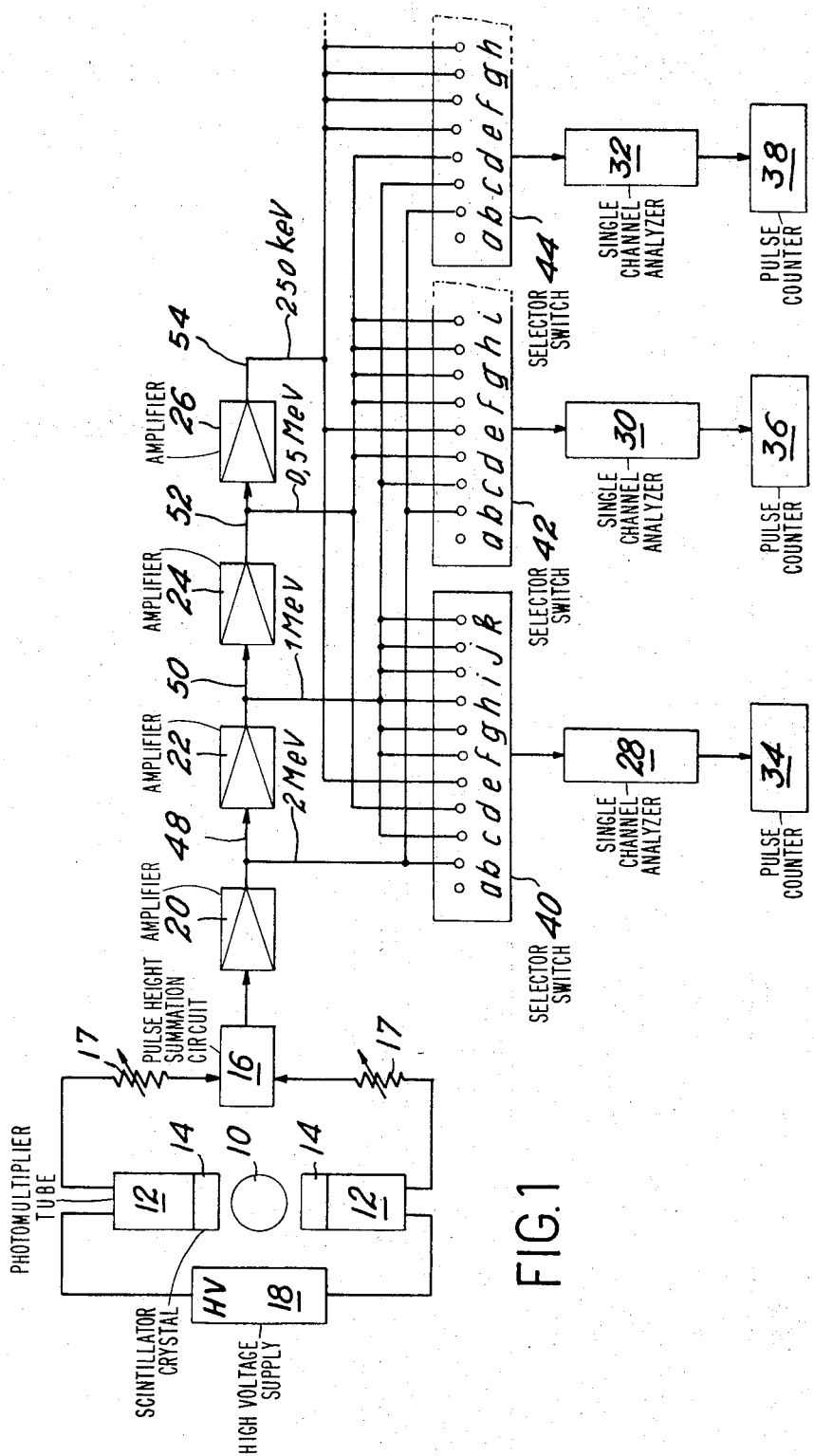
FIG. 1 is a schematic representation of a gamma counting system according to the invention.

Referring first to FIG. 1, there is shown a gamma counting system for spectrometry of a sample 10. Up to three gamma emitters having sufficiently separated peaks may be simultaneously counted in the system without the necessity for altering instrument settings once counting has begun; even more individual isotopes may be counted in a same sample, with repeat counting using different window settings, as will be explained later. The detection elements comprise two photomultiplier tubes 12, each associated with a scintillator crystal 14 (e.g. sodium iodide activated with thallium). The photomultipliers deliver, at their anodes, output pulses which have amplitudes proportional to the energy of the decay events which caused the scintillation. The anodes are connected to a conventional pulse height summation network 16 through manually adjustable balancing attenuators 17.

The crystal/photomultiplier assemblies are preferably located symmetrically with respect to a sample receiving chamber. A conventional high voltage supply unit 18, required for photomultiplier operation, is preferably adjustable for a purpose which will be made apparent later.

In the embodiment of FIG. 1, a summation arrangement is used. If two conventional hermetically sealed crystal/photomultiplier assemblies are used, all the light generated by one crystal is seen by one photomultiplier and there is no true "pulse summation." However, it is advantageous to bring the outputs of the two photomultiplier tubes together at one point so as to make use of but a single set of amplifiers. At the count rates which may be expected in routine use, the probability that both phototubes will pulse at the same time is small.

On the contrary, the summation circuit is of much advantage if a single scintillation crystal in the form of a horizontal cylinder is used, with the two photomultiplier tubes 12 looking at either end of the cylinder; a sample conveyor then moves the successive samples down into a diametrical vertical hole in the crystal and up back into the sample transport. Pulse summation is then necessary to obtain true representation of the energy of the decay event since the light from said event is distributed between the phototubes. Such a configuration also results in increased detection efficiency since the sample is completely surrounded by scintillation material during the counting period.

Figure 5:
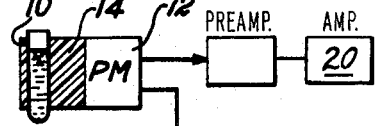
FIG. 5 is a schematic view of a modified scintillator crystal/photomultiplier assembly which may be used in the embodiment of FIG. 1.

Though using two opposed photomultiplier tubes with one or two crystals does offer definite advantage relative to the arrangement illustrated in FIG. 5 in which a "hole through" scintillation crystal is viewed by a single photomultiplier, the latter offers cost advantage at the expense of less efficient light collection; it may be used to replace the two crystal/photomultiplier assemblies and pulse summation network of FIG. 1. Referring to FIG. 5, where the components corresponding to those of FIG. 1 bear the same refernece numerals, there is shown a crystal 14 formed with a well into which the samples 10, in test tubes or in other convenient containers, are lowered by an elevator for counting.

A single photomultiplier tube 12, preferably enclosed in a hermetically sealed assembly together with the crystal, delivers pulses to amplifier 20.

Referring again to FIG. 1 of the drawings, the summation network 16 delivers signal pulses originating from either crystal/photomultiplier assembly (or which have a height equal to the sum of the individual pulses due to the same decay event and provided by the separate photomultipliers in the modified embodiment using a single crystal and two photomultipliers) to a series of cascaded linear amplifiers. In the embodiment described, the first amplifier 20 of the series has a gain sufficient to bring the amplitude of an input pulse, equal to that of the maximum energy gamma event with which the system will be expected to work, to a value equal to the maximum working value of the subsequent single channel analyzers 28, 30, and 32. A usual figure for such value in currently used analyzers is about 5 volts. A voltage gain of about 25 in the first amplifier is generally acceptable. The input pulse for adjusting such gain may originate with a decay event and use of the detectors and circuitry preceding the first amplifier. However, it may be preferable to employ a pulse generator directly at the amplifier input whose pulses can be conveniently adjusted to any desired amplitude, said pulse generator being used only for adjustment and not being an inherent part of the system.

The following amplifiers preferably each have the same gain: when three amplifiers 22, 24, and 26 are used, the gain of each is preferably 2, for reasons which will be explained later.

The system of FIG. 1 comprises the three single channel analyzers 28, 30, and 32, this number being in no way limitative since one would be sufficient for general purpose. However, provision of three analyzers makes it possible for three operators working on different isotopes to count them in succession without having to adjust the settings each time the samples of one operator replace those of another. In addition, up to three emission peaks of a single sample may be simultaneously counted. The output of each analyzer 28, 30, or 32 is associated with a respective pulse counter 34, 36, or 38 provided with conventional precount or pretime selection switches and with reset means (not shown).

The input of each analyzer 28, 30, or 32 may be connected in a variety of ways by a respective selector switch 40, 42, or 44. All three switches are identical and provide eleven possible combinations in the embodiment of FIGS. 1 and 2. As shown on FIG. 2, the movable arm 46 of switch 40 may be located by rotation of a manual knob 48 in eleven positions numbered from $a$ to $k$, thereby establishing the connections which are listed in the following table:

$a$: ("off" condition): the input of the analyzer 28 is not connected. $b$, $c$, $d$, and $e$: the input of the analyzer is connected to the outputs 48, 50, 52, and 54 of amplifiers 20, 22, 24, and 26, respectively.

$f$ and $g$: the input of analyzer 28 is connected to output 50, as in the case of position $c$. In addition, however, a selector arm 56, actuated in synchronism with arm 46, energizes a control input 58 or 60 of the analyzer, thereby fixing the amplitude window of the latter at a value preset on a respective pair of trimmer potentiometers by screws 62, 63 or 64, 65.

Figure 2:
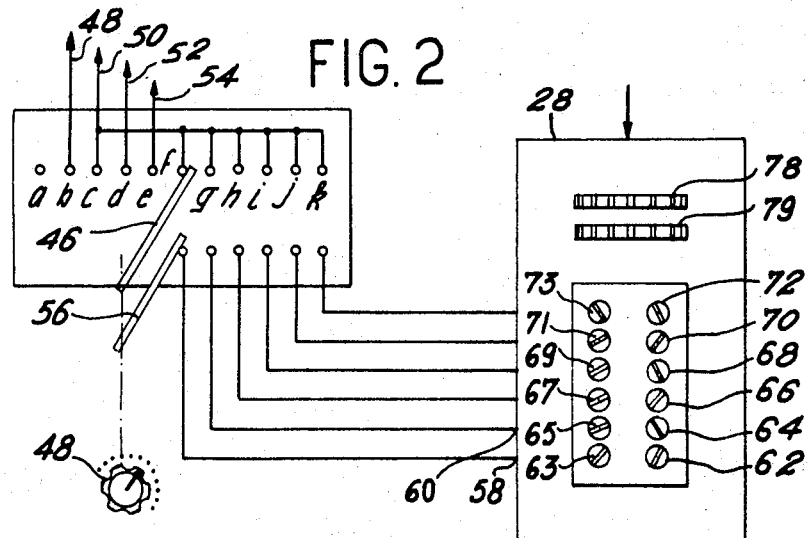
FIG. 2 is a schematic detail view illustrating the connections of the input switch of a single channel analyzer of FIG. 1.

$h$ and $i$: in the embodiment of FIG. 2, the input is still connected to 50 and, in addition, the window of the analyzer is determined by trimmer potentiometers 66, 67 and 68, 69, respectively.

$j$ and $k$: the input is still connected to 50 and the window is that preset by adjustment of 70, 71 or 72, 73. Similarly, in all six positions $f$ to $k$ of the knob (not shown) of switch 42, the input of analyzer 30 is connected to output 52 but six different preset counting windows are selected, one for each position. In the same way, the input of analyzer 32 is connected to output 54 for all six positions $f$ to $k$ of switch 44, as well as for position $e$; in lieu of six positions, providing three pairs of windows, $2p$ positions (with $p$ being an integer other than 3) may be provided.

While such an arrangement apparently makes it possible to provide any ratio between the overall gains at outputs 54 and 48, in fact, practical reasons limit the useful range. Given the lowest useful range, which may be taken as 0–250 keV, and the fact that emitters having an energy over 4 meV raise shielding problems, it can be seen that a ratio of 16, representing four cascaded amplifiers, each of gain 2, need not be exceeded: this makes it possible to expand the upper energy range to 4 meV, while retaining the 250 keV lower limit of the embodiment of FIG. 1. In other cases a ratio of 4:1 may be sufficient, since limiting the user to working with lower energy isotopes makes adequate shielding less of a problem. Also, the 16:1 ratio may be obtained by different combinations of less than four amplification stages, e.g., using stages having a gain of $2^n$, where $n = 2$ for one stage and $n = 1$ for two others.

As an example, it may be indicated that the overall gain of the system consisting of photomultiplier tubes, attenuators 17, and amplifier 20 may be selected for making it possible to count events having energies up to 2 meV on an analyzer connected to output 48. If all three amplifiers 22, 24, and 26 each have a gain of 2, analyzers connected to outputs 50, 52, and 54 will respectively be able to analyze pulses corresponding to maximum gamma energies of 1 meV, 0.5 meV, and 0.25 meV, respectively. If, for instance, the iodine-131 activity of a sample is to be counted, the corresponding analyzer will be connected to output 50 or 52 (i.e. arm 46 will be put on $c$, $d$, $f$, $g$, $h$, $i$, or $k$), since iodine-131 has a peak at 364 keV. If the sample is single labeled with iodine, the window can be selected to encompass a broad energy range with a lower limit which corresponds to the lowest energy limit of the iodine spectrum. If, on the contary, another isotope emitting gammas of different energy is present, the window should be reduced to encompass only the iodine-131 photopeak, thereby eliminating or at least reducing cross-contribution of the second isotope present to the iodine-131 channel.

Adjustment of the windows may be made manually with a pair of potentiometers carried by the analyzer, actuated by dials 78 and 79 (which may be 10-turn dials) located on the instrument front panel and which determine the counting window each time the input signals are delivered with arm 46 on any position from $b$ to $e$. In addition, positions $f$ to $k$ provide an easy and simple way of counting the more currently used isotopes without need of tedious and time-consuming adjustment.

As an example, positions $f$ and $g$ may be used for counting cesium-137 (actually the 2.6 minute barium-137$^m$ daughter of the cesium-137 beta decay) in so-called "broad" and "peak" windows respectively.

Figure 3:
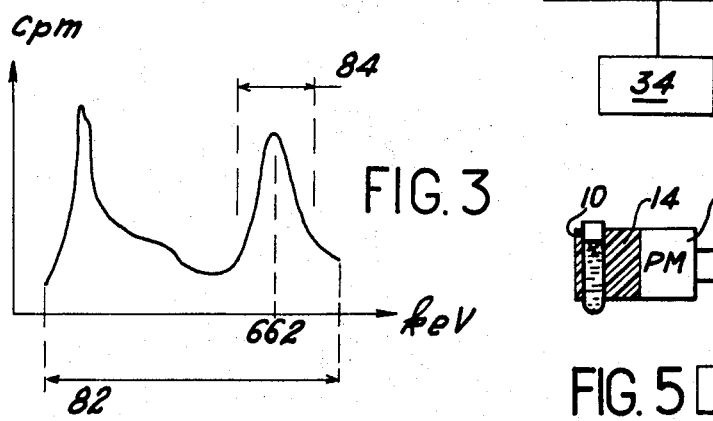
FIG. 3 is a histogram of the pulse height spectrum arising from the radioactive decay of cesium-137 indicating counting windows provided by the system of FIGS. 1 and 2.

Referring to FIG. 3, there is plotted the observed count rate (cpm) vs. energy for a sample containing cesium-137. Maximum efficiency in the counting of cesium-137 is obtained by using the "broad" window 82 which encompasses substantially the complete energy range and is preset by the trimmer potentiometers 62 and 63 associated with position $f$. In the presence of another isotope of different energy, position $g$, providing a counting window which encompasses substantially only the cesium-137 photopeak, is preferably used; the peak window corresponds to 84 of FIG. 3. Pulse height analyzer settings providing said window are made by trimmer potentiometers 64 and 65.

Similarly, the pairs of potentiometers 66, 67 and 70, 71 will be used to establish "broad" windows corresponding to other gamma emitters which might be routinely counted in analyzer 28 while potentiometer pairs 68, 69 and 72, 73 are used to establish corresponding "peak" windows. All six preset windows of any one analyzer will generally correspond to radioisotopes having peaks which are close to each other so that it is unlikely that many investigators will tend to use them in the same experiment. Should they be used together, separation may still be achieved by means of manual discriminator adjustment. Exemplary of such isotopes are iodine-131, chromium-51, and mercury-203 whose peaks are respectively at 364 KeV, 325 keV, and 279 keV. The corresponding windows may be provided for by positions $f$ to $k$ of selector switch 42. The last selector switch 44 may provide preset windows for several low energy isotopes such as iodine-125 which exhibits a peak at 40 keV.

Assuming that the windows have been preset, the operator need only recalibrate the system periodically using a radioisotope having a well defined peak. Cesium-137 is of particular advantage for such use since its peak falls in the mid-energy range of many of the commonly employed gamma emitters and its half-life is sufficiently long that frequent corrections for decay need not be made. A standard may be placed in the detection chamber between the crystals 14, and one of switches 40, 42, or 44 is set on a position previously selected to provide discrimination levels which bracket the cesium-137 photopeak, said selection and adjustment being best made at the time of instrument manufacture or installation. The high voltage is then adjusted to modify the gain of the photomultipliers and to shift the pulse height spectrum until the count rate within the preadjusted window is maximum. The cesium-137 peak is then centered within the window. Assuming amplification to be truly linear, the settings of the potentiometer dials, when multiplied by the energy ranges corresponding to positions $b$, $c$, $d$, and $e$ of switches 40, 42, and 44, read directly in energy units if, as is usual, the potentiometer dials have 1000 graduations. Further, if all other preadjusted counting windows have been properly established during instrument manufacture or installation, count rates within these windows for their appropriate isotopes will be maximized.

Apparently, the system has a drawback: a pulse of large energy will overload and saturate the last amplifiers which may not recover fast enough to pass a subsequent pulse of smaller amplitude. In fact, this drawback is far more theoretical than real. Modern pulse amplifiers have recovery times of about 1 $\mu$sec for 400 times overload, a figure not likely to be exceeded by the isotopes for which the system is meant. Further, the usual count rates encountered in gamma assay rarely exceed several hundred thousand counts per minute at which rate there is ample time for amplifier recovery. However, should anticipated count rate exceed this order of magnitude, conventional "live timing," combined with a fixed dead time longer than the amplifier recovery time, may be included in the system thereby providing automatic compensation for so-called "coincidence count loss."

Operation of the system is apparent from the above and will only be briefly described. Each sample to be assayed is successively entered into the counting chamber, the appropriate counting window or windows having been previously selected. If the sample is singly marked, a "broad" window may be used, either preset (switch positions $f$, $h$, or $j$) or established with the potentiometer dials if not available in preset form (the location being selected from $b$ to $e$ depending upon energy). On the contrary, a "peak" window will be selected for each isotope for multiple isotope counting.

Figure 4:
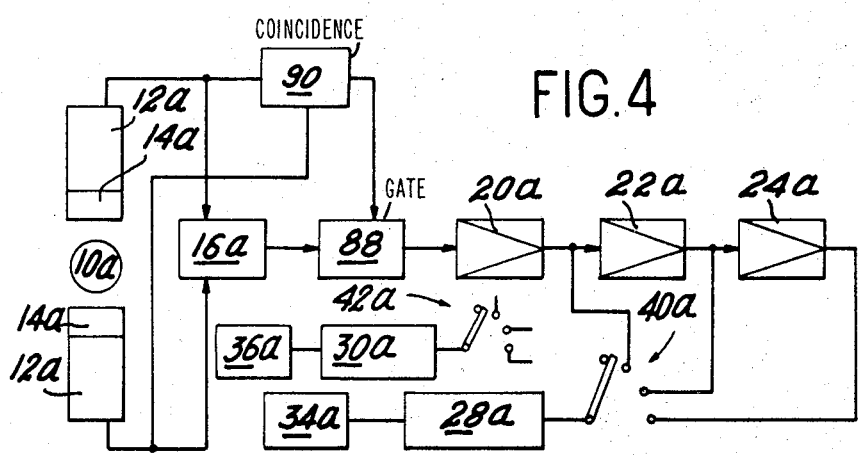
FIG. 4 is a simplified block diagram of a modified embodiment of the invention.

Referring to FIG. 4 of the drawings, there is shown a modified embodiment which is provided with a coincidence system adapted to positron counting and which may be optionally used or rendered inoperative by means not shown. Coincidence counting may also prove useful for counting low energy gammas with a through hole detector with two photomultiplier tubes; the coincidence circuitry rejects non-coincident noise pulses arising from the two phototubes.

The system of FIG. 4 comprises photomultiplier tubes 12$a$ and crystals 14$a$ and a summation network 16$a$ similar to those of FIG. 1. Pulses from the summation network are directed to a linear gate 88 which is opened by a coincidence circuit 90 upon reception by the latter of simultaneous pulses from the phototubes. Discriminators (not shown) are prefereably provided at the inputs of circuit 90 to stop pulses whose amplitudes are lower than a predetermined value. Pulses passed by gate 88 are successively amplified by three cascaded amplifiers 20$a$, 22$a$, and 24$a$ which may have gains of 25, 3, and 3 respectively, thereby providing three possible energy ranges. An analyzer 28$a$ or 30$a$ may be connected by a respective selector switch 40$a$ or 42$a$ to the output of any one of the amplifiers.

We claim:

1. A spectrometer system for measuring gamma decay events of $n$ different radioisotopes ($n$ being a predetermined integer) having different energy spectra and contained in successive samples, comprising:

scintillation detector means responsive to said decay events occurring in a sample, for producing light flashes and electrical pulses whose amplitude is in direct relation with the energy of the originating decay events, first linear amplification means providing a predetermined amplification gain for processing said electrical pulses, second amplification means for amplifying the output pulses of said first amplification means, comprising a plurality of cascaded linear amplification stages in series aiding relation, each providing a predetermined amplification gain, and at least $n$ counting channels, each having counting means a single channel analyzer for passing only a selected amplitude range of said electrical pulses to said counting means, said analyzer having means for manual adjustment of said amplitude range, and separate operator controlled selector means for connecting the input of said analyzer to the outputs of a selected one of the first amplification means or any of the cascaded linear amplification stages making up said second amplification means.

2. A spectrometer system according to claim 1, wherein said scintillation detector means comprise a plurality of photomultiplier tube and scintillation crystal assemblies whose signal outputs are brought to a common point before being directed to said first amplification means.

3. A spectrometer system according to claim 1, wherein said scintillation detector means comprise a plurality of photomultipliers coupled to a single scintillation crystal and whose signal outputs are summed before being directed to said first amplification means.

4. A spectrometer system according to claim 2 additionally including means for coincidence gating the pulses prior to counting them in accordance with the electrical pulses received from said plurality of photomultiplier tubes.

5. A spectrometer system according to claim 3 additionally including means for coincidence gating the pulses prior to counting them in accordance with the electrical pulses received from said plurality of photomultiplier tubes.

6. A spectrometer system according to claim 1, having means for adjusting the photomultiplier high voltage supply.

7. A spectrometer system according to claim 1, wherein the stages comprising the second amplification means provide amplitude gains which are in the ratio of $2^n:1$, $n$ having a value from 2 to 4.

8. A spectrometer system according to claim 1, wherein the stages comprising the second amplification means each provide a gain of $2^n$, $n$ having a value at most equal to 2.

9. A spectrometer system according to claim 1, having a pulse preamplifier at the output of any or all photomultiplier tubes employed for detection of said light flashes.

10. A spectrometer system for measuring the gamma decay events of $n$ different radioisotopes having different energy spectra and contained in samples, comprising:
detector means responsive to said gamma decay events in a sample, for producing corresponding electrical pulses whose amplitudes are in direct relation with the energies of the originating decay events,
first linear amplification means providing a predetermined amplification gain for processing said electrical pulses,
second amplification means for amplifying the output pulses of said first amplification means comprising a plurality of cascaded linear amplification stages in series aiding relation, each providing a predetermined amplification gain,
and at least $n$ counting channels each having counting means,
a pulse height analyzer for passing only a selected amplitude range of pulses to said counting means,
operator controlled means for adjusting said amplitude range,
and operator controlled means for connecting the input of said analyzer to the outputs of a selected one of the first amplification means or any of the cascaded linear amplification stages making up said second amplification means.

11. A spectrometer system according to claim 10, wherein each said analyzer has a plurality of means for presetting an amplitude window of said analyzer, having additional operator controlled means permitting selection of any one of said preset windows.

12. A spectrometer system according to claim 11, wherein said additional means are drivably connected to the output selector means for simultaneous operation thereof.

13. A spectrometer means according to claim 11, having $2p$ presetting means, $p$ being a predetermined integer, providing $p$ windows preset for encompassing substantially the complete ranges of pulse amplitudes due to $p$ different gamma emitters, the remaining $p$ windows being each preset for each bracketing an emission peak of a separate one of said $p$ emitters.

14. A spectrometer system according to claim 13, wherein said $p$ emitters are selected among emitters having energy spectra which render separate simultaneous counting thereof in a same sample difficult.

15. A spectrometer system according to claim 13, wherein said additional means and output selector means are mechanically coupled for simultaneous operation thereof and have at least $2p + n$ $n- 1$ positions, said amplifier means in $2p + 1$ of said positions while said additional means select one different of the preset windows and of an adjustable window for each of said $2p + 1$ positions.

* * * * *